United States Patent
Pooser

(10) Patent No.: US 9,335,973 B2
(45) Date of Patent: May 10, 2016

(54) QUANTUM RANDOM NUMBER GENERATOR

(71) Applicant: UT-Battelle, LLC, Oak Ridge, TN (US)

(72) Inventor: Raphael C. Pooser, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 251 days.

(21) Appl. No.: 14/147,131

(22) Filed: Jan. 3, 2014

(65) Prior Publication Data

US 2015/0193207 A1 Jul. 9, 2015

(51) Int. Cl.
*G06F 7/58* (2006.01)

(52) U.S. Cl.
CPC .................................. *G06F 7/588* (2013.01)

(58) Field of Classification Search
None
See application file for complete search history.

(56) References Cited

U.S. PATENT DOCUMENTS

| | | | | |
|---|---|---|---|---|
| 8,554,814 B2* | 10/2013 | Qi | ............................ | G06F 7/588 708/255 |
| 2012/0045053 A1* | 2/2012 | Qi | ............................ | G06F 7/588 380/252 |
| 2013/0036145 A1* | 2/2013 | Pruneri | .................... | G06F 7/588 708/191 |
| 2015/0154007 A1* | 6/2015 | Sussman | ................. | G06F 7/588 708/250 |
| 2015/0193201 A1* | 7/2015 | Mathur | ...................... | G06F 5/16 710/56 |
| 2015/0288517 A1* | 10/2015 | Evans | .................... | H04L 9/0883 713/168 |
| 2015/0331672 A1* | 11/2015 | Yuan | ........................ | H01S 5/065 359/107 |

OTHER PUBLICATIONS

Stefanov, Andre, et al, "Optical quantum random number generator," J. Mod. Opt., vol. 47, No. 4, pp. 595-598 (2000).
Jennewein, Thomas, et al, "A fast and compact quantum random number generator," Rev. Sci. Instrum., vol. 71, No. 4, pp. 1675-1680 (2000).
Rarity, J.G., et al, "Quantum random-number generation and key sharing," J. Mod. Opt., vol. 41, No. 12, pp. 2435-2444 (1994).
Stipcevic, M., et al, "Quantum random number generator based on photonic emission in semiconductors," Rev. Sci. Instrum. 78, 045104, pp. 1-7 (2007).
Wayne, Michael A., et al, "Low-bias high-speed quantum random number generator via shaped optical pulses," Optics Express, vol. 18, No. 9, pp. 9351-9357 (2010).
Satoh, Akashi, "Hardware Architecture and Cost Estimates for Breaking SHA-1," Information Security: 8th International Conference, ISC 2005, LNCS 3650, pp. 259-273 (2005).

* cited by examiner

*Primary Examiner* — David H Malzahn
(74) *Attorney, Agent, or Firm* — Warner Norcross & Judd LLP

(57) ABSTRACT

A quantum random number generator (QRNG) and a photon generator for a QRNG are provided. The photon generator may be operated in a spontaneous mode below a lasing threshold to emit photons. Photons emitted from the photon generator may have at least one random characteristic, which may be monitored by the QRNG to generate a random number. In one embodiment, the photon generator may include a photon emitter and an amplifier coupled to the photon emitter. The amplifier may enable the photon generator to be used in the QRNG without introducing significant bias in the random number and may enable multiplexing of multiple random numbers. The amplifier may also desensitize the photon generator to fluctuations in power supplied thereto while operating in the spontaneous mode. In one embodiment, the photon emitter and amplifier may be a tapered diode amplifier.

20 Claims, 2 Drawing Sheets

QUANTUM RANDOM NUMBER GENERATOR

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present invention relates to a random number generator, and more specifically to a quantum random number generator.

BACKGROUND OF THE INVENTION

Random numbers are used on a daily basis in a variety of applications, including encrypting communication and authentication between entities. For example, in authentication, an entity may confirm its identity with another entity to access information. Put differently, an entity, such as a user or software running on a computer, may authenticate with another entity in order to achieve a degree of certainty about whether communications are from whom the communication claims to be.

One type of authentication system prevalent in and outside the Internet utilizes two-factor authentication. As an example, a user may authenticate with another entity by entering their password and a one-time pad (OTP) generated by a security token. In this system, the OTP generated from the security token (something you have) is combined with the password (something you know) to form a two factor authentication system. Many of these hardware authentication tokens or security tokens are now about the size of a keychain, and offer a degree of assurance that the entity providing the password and OTP is whom they claim to be. However, these conventional two-factor authentication systems are also not without weaknesses. The security of the two-factor system is based in part on the premise that the OTP generated from the security token is truly random and cannot be reproduced computationally. This premise has been reported as being subject to compromise.

For instance, the OTP in conventional two-factor systems is often times based on a pseudorandom stream of randomness, or a computationally random seed. That is, a conventional computational random number generator (CRNG) is used as a source of assumed randomness to provide a seed value (e.g., a pseudorandom number), which is used as an input to a hashing algorithm, such as SHA-256. The hashing algorithm may be assumed to construct a resulting random number using a non-reversible and apparently non-Markovian process.

However, reliance on the seed of a conventional CRNG to be a source of true randomness may be misplaced. Conventional CRNGs may utilize deterministic processes on a computer to generate a seed. Deterministic algorithms may not be fully irreversible—though irreversibility may be mimicked to some extent by using bitshifting and "chunk" divisions in the hashing algorithm. It has been shown that, using supercomputing clusters and large hash computation tables, hashing algorithms (e.g., SHA-256) may be reverse engineered via collision detection to determine the initial seed. These reverse engineering techniques may exploit the psuedorandomness of the initial seed output from a conventional CRNG as a weakness to deduce the initial seed based on the output of the hashing algorithm. Once the initial seed value has been deduced, techniques may be used to deterministically generate subsequent random numbers or OTPs, thereby enabling an attacker to mimic the OTP generated from the authentication system without actually possessing the security token.

Attempts have been made to utilize quantum random number generators (QRNG) to forgo reliance on the deterministic computational process of the CRNG. Quantum mechanics provides an inherent randomness from nature that is not computationally deterministic; rather, the randomness afforded by nature is considered truly random or unbreakable with computational power. The source of randomness from nature may be used to develop a seed and hashing algorithms that are fully irreversible. QRNGs may attempt to benefit from nature's randomness to generate a random number. In a conventional QRNG, probabilistic, natural processes may be partially controlled by an observer, and monitored to record random events. These recorded random events may be incorporated into random numbers.

Although nature is considered to be a source of true randomness, many conventional QRNGs have not been able to fully benefit from this true source of randomness to generate a truly random number. In controlling nature or recording it, conventional QRNGs may introduce significant bias in the generated random number, potentially skewing it away from true randomness. Bias in the context of QRNGs may be conceptualized as a predominance toward one recorded event over another. For example, in a conventional QRNG that records one event as a binary 0 and another event as a binary 1, a predominance in the recorded events toward either 1s or 0s may indicate bias.

As an example, photon emission from a laser, operated above the lasing threshold, has been utilized as a quantum mechanical process for generating random numbers. Photons from the laser may be directed toward a 50/50 beam splitter, 50% reflecting and 50% transmitting. Two detectors are positioned to detect which path a photon takes, which may be truly random according to quantum mechanics. In this way, a transmitted photon may be detected as a binary 1 and a reflected photon may be detected as a binary 0, thereby being used to generate a random number. However, because the 50/50 beam splitter is often times misaligned to some degree in this conventional QRNG, the generated random number may include bias toward 0s or 1s. Bias may also be introduced in operation of the laser itself, and through the use of two separate detectors. Overall system cost may also be increased by using two separate detectors.

In another example, a time-resolved measurement of photons from a laser, operated above the lasing threshold, may be used as a basis for using quantum mechanics to generate a random number. In this conventional QRNG, the arrival time of photons is detected relative to one another, and after a sufficient number of data points are detected, the distribution may provide enough entropy for a random number. However, the arrival distribution of photons emitted from the laser operated above the lasing threshold may have some shape (such as a sharp peak at a particular arrival time) that results in bias.

SUMMARY OF THE INVENTION

A quantum random number generator (QRNG) and a photon generator for a QRNG are provided. The photon generator may be operated in a spontaneous mode below a lasing threshold to emit photons. Photons emitted from the photon generator may have at least one random characteristic, which may be monitored by the QRNG to generate a random number. In one embodiment, the photon generator may include a photon emitter and an amplifier coupled to the photon emitter. The amplifier may enable the photon generator to be used in the QRNG without introducing significant bias in the random number. The amplifier may also desensitize the photon generator to fluctuations in power supplied thereto while operating in the spontaneous mode.

In one embodiment, the amplifier may be a tapered amplifier. The tapered amplifier may include an optical cavity, between a photon input and a photon output, that tapers. For example, the optical cavity may be dimensionally larger near the photon output than near the photon input. In one embodiment, the photon emitter and the tapered amplifier may be an integrated component including a semiconductor. The integrated component may be a tapered amplifier diode laser.

In one embodiment, the QRNG may include a detector configured to detect photons emitted from the photon generator, and to provide a detection signal indicative of each detected photon. A processor operably coupled to the detector may generate a random number based on said detection signal. For example, the detection signal may be indicative of a timing characteristic of each detected photon, which as mentioned herein, may be random due to quantum mechanics. By processing the arrival times of photons relative to each other, the processor may generate a random number. As another example, the detection signal provided by the detector may be indicative of a direction of a photon emitted from the photon generator. Because the direction of photons emitted from the photon generator may be random, the processor may analyze the detection signal to output a random number representative of the random directions of photons detected by the detector.

In one aspect, a method of generating a random number includes operating a photon generator of a QRNG below a lasing threshold of the photon generator. In this way, the photon generator may be operated in a spontaneous mode such that a characteristic of photons emitted from the photon generator is random. The output of the photon generator may be attenuated such that the statistical distribution of the photons follows a Poisson distribution. The method includes detecting the photons emitted from the photon generator, and providing a detection signal indicative of each detected photon. The detection signal may be indicative of the random characteristic of each detected photon, and may be used as a basis for generating a random number.

In one aspect, a QRNG according to one embodiment may generate random numbers without significant bias. The random numbers may also be generated at a sufficiently high bandwidth for use in a variety of authentication and encryption applications, such as in security tokens or cellular phone communication. For example, the QRNG may be configured to substantially avoid quantum number bunching due at least in part to operation above the lasing threshold. As another example, the QRNG may be desensitized to variations in power supplied to the photon generator such that such variations do not result in significant bias. In another example, the statistics of one generator may be used to condition the statistics of another generator to calculate an inverse distribution for the purpose of substantially removing bias. For example, the QRNG may be multiplexed based on a characteristic, such as frequency or power, and the multiplexed signal may be used to feed-forward to a detector. In one multiplexed configuration, a multiplexed arrival time signal may be used to apply an inverse bias-removal stage for generating a random number. In another multiplexed configuration, multiplexed position detection may be used to feed forward to position sensitive detectors to eliminate bias.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
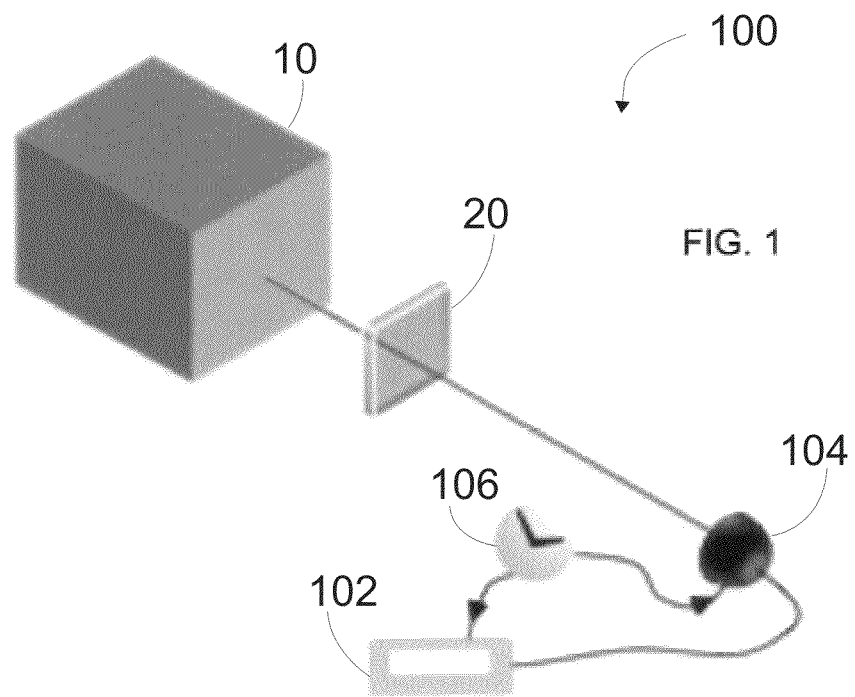
FIG. 1 is a quantum random number generator according to one embodiment.
Figure 2:
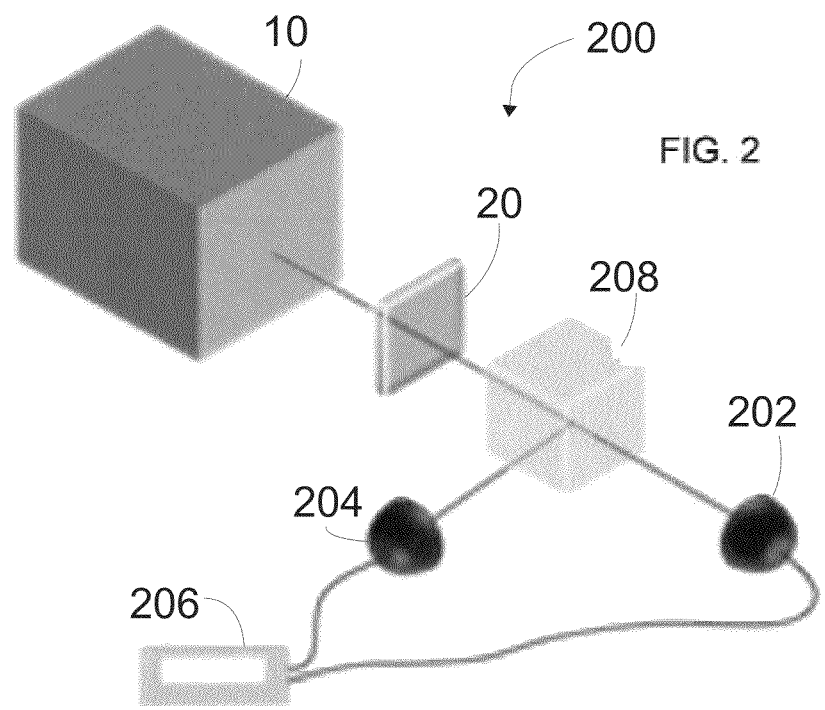
FIG. 2 is a quantum random number generator according to one embodiment.
Figure 3:
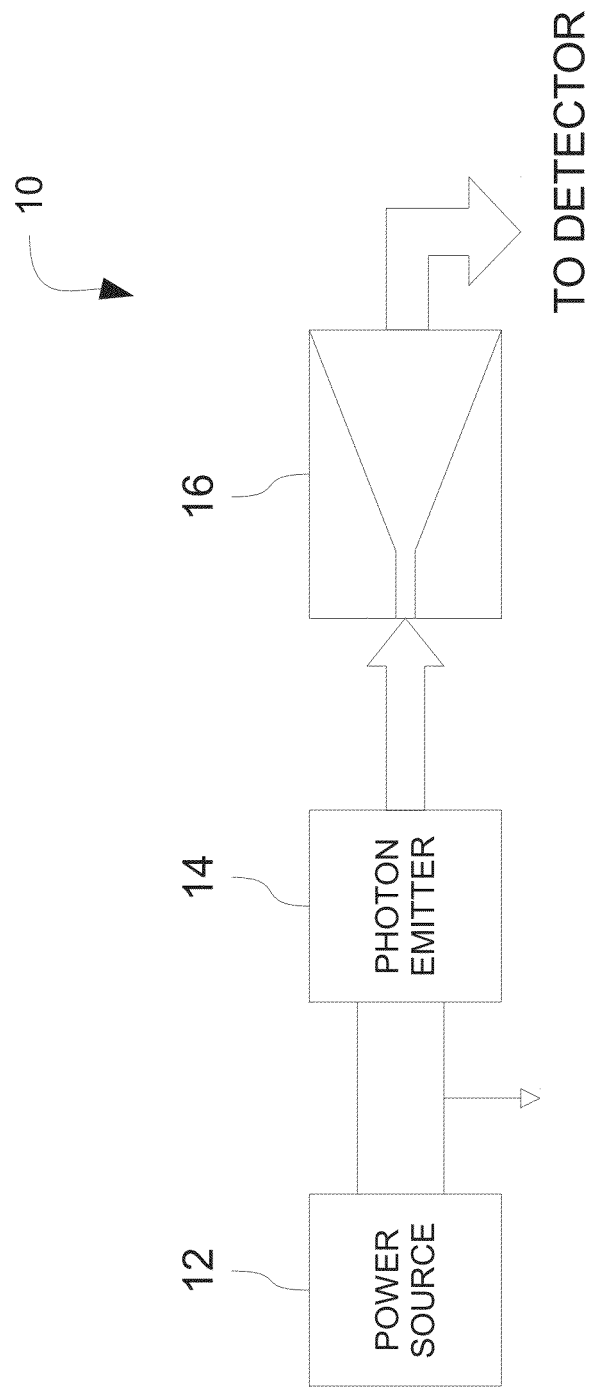
FIG. 3 is a photon generator for emitting photons in a quantum random number generator according to one embodiment.

A system and photon generator for generating random numbers in accordance with one or more embodiments are shown in FIGS. 1-3. As set forth below, the photon generator in one embodiment may utilize a photon emitter in conjunction with an amplifier to emit photons at random times or random directions, or both. The photon generator may be used within a system to form a quantum random number generator (QRNG). In one embodiment, the photon generator may be configured to achieve photon emission without significant bias caused by variations in a control parameter. For example, a control parameter, such as input current to the photon emitter, may be large relative to variations (such as ripple, noise, or deviations, or a combination thereof) in the control parameter such that any bias introduced in a random number by the variations is substantially nonexistent or insignificant.

Referring now to the illustrated embodiment of FIGS. 1 and 3, a QRNG according to one embodiment is generally designated 100, and includes a photon generator 10. The QRNG 100 may include a filter 20, detector 104, timing device 106 and a processor 102. Photons emitted from the photon generator 10 may be directed through the filter 20, which may operate to attenuate output from the photon generator 10 so that single photons may occasionally transmit through the filter 20 to the detector 104. In this way, the QRNG 100 may avoid overwhelming the detector 104 with photons from the photon generator 10, while providing the detector 104 with a sufficient number of photons for generating a random number. In the illustrated embodiment of FIG.

1, the filter 20 is a neutral density filter, but it should be understood the filter 20 may be any type of filter capable of affecting output from the photon generator 10. As an example, the filter may include a frequency filter.

In one embodiment, the detector 104 and timing device 106 may operate in conjunction with each other to detect the occurrence of photons and to correlate a time characteristic of each photon relative to other photons. The detector 104 may be a semiconductor device including photo diodes capable of substantial one by one detection of photons emitted from the photon generator 10. In addition to or alternatively, the detector 104 may also include photodiodes capable of detecting macroscopic numbers of photons. The detector 104, with the ability to detect macroscopic photon numbers, may be used, for example, to measure continuous intensity statistics, allowing for detection of the photon shot noise level.

The processor 102 may be operably coupled to the detector 104 and timing device 106, and may translate or process the timing characteristics of photons into a random number. For example, the processor 102 may utilize time-to-digital conversion to translate intervals between detected photons to a random number. In this way, the processor 102, detector 104, and timing device 106 may operate in conjunction with each other to generate a random number based on the randomness of a natural event, such as the emission of photons from the photon generator 10. More specifically, the detector 104 may aid in identifying random photon arrival times associated with photons emitted from the photon generator 10. The timing device 106 and processor 102 may utilize a detection signal output from the detector 104 to generate a random number based on the random arrival times. The processor 102 may achieve this by comparing the arrival time of a logic pulse generated by the photon detector 104 with the arrival time of a logic pulse generated by an onboard clock, such as that produced by a phase-lock-loop (PLL), or the same produced in software on a general purpose processing device, such as a field-programmable-gate-array (FPGA), or on a purpose-built device such as a digital microprocessor. The processor 102 may employ various comparator stages or digital measurements to measure arrival time. A photon detected at a given clock pulse may be labeled as having arrived at the given clock pulse, and subsequent detected photons may be labeled as having arrived at later clock pulses.

For example, by associating logic pulses output from the photon detector 104 with time frames or pulses of a given clock, the processor 102 may generate a random number. For a 400 MHz clock with 400 million clock cycles per second, detected photons may be binned in an associated cycle of the 400 million for each second (or a period of time). Based on the binning for each second (or period of time), a number may be generated for each photon. For instance, if a photon is binned in the first half of a characteristic arrival time period associated with the photon distribution (such as a few microseconds), the processor 102 may output a binary 0 for that photon. And, if a photon is binned in the second half of this time period, the processor 102 may output a binary 1 for that photon. This process may be repeated as many times per second as photons are detected. For purposes of disclosure, the processor 102 is described as dividing each time period into two, but it should be understood the processor 102 may generate a random number by analyzing the bins for each period of time in a variety of ways. As an example, each time period may be divided into four so that a random number from zero to three may be generated for each photon.

In the illustrated embodiment, the processor 102 includes a logic counter, but it should be understood that the QRNG may include any type of processor or logic circuitry capable of processing a detection signal indicative of a characteristic of photons emitted from a photon generator 10 to generate a random number. Although shown as separate components, one or more of the processor 102, detector 104, and timing device 106 may be integrated. Further, one or more of the processor 102, detector 104, and timing device 106 may be formed of separate components.

In the illustrated embodiment of FIG. 3, the photon generator 10 may include a photon emitter 14 and an amplifier 16. The photon emitter 14 and amplifier 16 may be integrated to form the photon generator 10, such as in the form of a monolithic semiconductor tapered amplifier. The photon emitter 14 may be configured for spontaneous emission or stimulated emission. The photon generator 10 may also include a power source 12 capable of supplying power to the photon emitter 14 for operation, including power to operate the photon generator 10 below a lasing threshold. The power source 12 may include control circuitry capable of controlling a characteristic of power, such as an amount of current or voltage, supplied to the photon emitter 14, and may include feedback circuitry capable of monitoring an operating parameter of the photon emitter 14, and controlling the characteristic of power as a function of the monitored operating parameter.

The photon emitter 14 in one embodiment may be a semiconductor diode, which may generate photons in a random manner according to quantum mechanics. In other words, the process of generating photons from a semiconductor diode may be inherently quantum mechanical because electrical current within the semiconductor may be quantized. When a hole-electron pair combine at a diode junction of the semiconductor diode, the hole-electron pair may release a single quantum of electromagnetic energy, or photon, at a random time and direction, as imposed by quantum mechanics through the superposition principle.

The photon emitter 14 in the illustrated embodiment may be operated in a spontaneous mode to achieve spontaneous emission of photons. In particular, rather than operating the photon emitter 14 above the lasing threshold to emit light or photons in a Poisson distribution, the photon emitter 14 may be operated below the lasing threshold in a spontaneous mode of operation. In this spontaneous mode of operation, the photons output from the photon emitter 14 may be random within the lifetime of the photon emitter 14.

Although light output from the photon emitter 14 in the spontaneous mode of operation may be random, in one embodiment in which the photon emitter 14 is a semiconductor diode, the distribution of photons emitted from the photon emitter 14 may not be completely representative of white noise. In other words, the semiconductor diode in one configuration, while operated in a spontaneous mode, may emit photons in a distribution having bias toward one result or another. For example, the distribution of photons from the semiconductor diode, while operated in a spontaneous mode, may lead to photon number crunching, a process also known as quantum noise reduction (or "squeezing"). These statistical anomalies in photon emission may lead to bias in the random number generated by the QRNG 100. For purposes of disclosure, an embodiment is described in which a semiconductor diode used as a photon emitter 14 may result in photon number crunching while operated in a spontaneous mode. However, it should be understood that a semiconductor diode in one embodiment may generate photons without resulting in photon number crunching or significant bias, or may generate photons having a distribution that is substantially white noise. Further, quantum noise reduction may be removed through use of a filter 20 such that non-uniform photon statistics are substantially removed or reduced to provide substantially uniform statistics, i.e. white noise.

In one embodiment in which the photon emitter 10 is capable of emitting macroscopic numbers of photons, such as in a tapered amplifier, the output of the photon emitter 10 may be multiplexed in order to increase the bandwidth of the QRNG 100. In a multiplexing configuration, one or more filters 20 may provide additional outputs beyond the single output shown in FIG. 1. In other words, the one or more filters 20 may operate on a characteristic of the photons, such as frequency or intensity, to provide two or more outputs, which may be used as a basis for generating a random number. For each additional filter output, an additional detector 104, timing unit 106, and processor 102 may be used. Multiple processors or a multiplexor, or both, may be implemented in the same hardware via software or via programmable hardware logic to multiplex the two or more outputs. In this configuration, the bandwidth of the QRNG is increased by a multiple equal to the number of multiplexed outputs. In this configuration, the multiplexed output signals after processing may be used to feed forward onto independent multiplexed outputs in order to remove bias during processing. For example, multiplexing the outputs in the QRNG 100 may achieve increased bandwidth with a substantial reduction in bias by inverting the distribution of one output and adding the inverted distribution to the other output to provide a multiplexed output. As another example, where the distribution of the outputs is exponential, inverting one of the outputs and adding it to the distribution of the other output may achieve a flat distribution or a distribution without bias. In an embodiment with one output, a multiplexed output may be generated by multiplexing the output for one time period against the same output for another time period.

In one embodiment, the photon emitter 14 may be sensitive to variations in the power supplied from the power source 12. For example, a semiconductor diode used as a photon emitter 14 in one embodiment may bias the random number generator if the current supplied from the power source 12 is not held substantially constant. In other words, small variations in the current supplied to the semiconductor diode may skew or bias a random number based on monitored characteristics of the photons emitted from the semiconductor diode. It should be understood, however, that a semiconductor diode in one embodiment may be less sensitive to variations in supply power, thereby potentially avoiding bias in random photon emission due to small variations. Further, it should be noted that this bias may be substantially removed through the use of a filter 20 in cases where the bias is not too large compared to the input current.

In the illustrated embodiment of FIG. 3, photons emitted from the photon emitter 14 may be directed through an amplifier 16. The amplifier 16 may include a photon input and a photon output, which may be in optical communication with each other via an optical cavity. The photon input of the amplifier 16 may receive photons from the photon emitter 14, and direct the photons toward the optical cavity. The amplifier 16 may enable the photon emitter 14 to be operated in spontaneous mode, below the lasing threshold, without introducing significant bias. For instance, by using an amplifier 16 in conjunction with the photon emitter 14, the distribution of photons output from the photon generator 10 may be substantially free from statistical anomalies, such as photon number bunching. An amplifier may add a degree of noise dictated by quantum mechanics, which may effectively cancel the noise reduction that may be present in a biased photon emitter. With an amplification gain high enough, substantially no quantum noise reduction may remain on the output of the photon generator 10. Additionally, the use of an amplifier 16 may also desensitize the photon generator 10 to variations in power supply. A tapered amplifier may emit white noise for high input currents, on the order of 1 or more amps, from a power supply capable of substantially limiting fluctuations in input current relative to the high input current. Because fluctuations in input current are low, the amplifier may be less susceptible to noise than a conventional laser diode, which may use tens of milliamps or less.

In one embodiment, the amplifier 16 may be a tapered amplifier, such as Eagleyard EYP-TPA-0795-02000-4006-CMT04-0000. The tapered amplifier may include an input channel that receives photons emitted from the photon emitter 14, and an output channel, in optical communication with the input channel, that emits photons from the amplifier 16. Within the tapered amplifier, the input channel may lead photons toward a tapered angle waveguide having a diffraction angle, which may be configured to transmit several modes of a given wavelength of light. Due in part to the tapered angle cavity, the output channel of the tapered amplifier may be dimensionally larger than the input channel. In one embodiment, the photon emitter 14 and the amplifier 16 may be integrated. For example, a tapered amplifier diode may be used for both generation of photons and amplification. A tapered amplifier diode according to this embodiment, operated in a spontaneous mode, may generate large amounts of spontaneous photon emission in response to a large current supply, such as 3 mA-4 A, or 1-4 A, depending on the electrical characteristics of the tapered amplifier diode. Because the input current in this embodiment is large, small imperfections or deviations in the amount of current supplied to the tapered amplifier diode may have substantially no effect on the spontaneous photon distribution, and therefore may not introduce bias into the random number generator. Put differently, the distribution of photons emitted from the tapered amplifier diode may be considered broadband noise or without bias despite fluctuations in the power supply. A tampered amplifier diode according to one embodiment may emit photons while supplied power in a power range, such as 3 $\mu$A to 25 mW, depending on the electrical characteristics of the tapered amplifier diode.

In one embodiment, a method of generating a random number in a QRNG that utilizes the properties of quantum mechanics may include operating a photon generator below its lasing threshold to emit photons in a spontaneous mode. The photon generator in this embodiment may be similar to the photon generator 10 described with respect to the illustrated embodiments of FIGS. 1 and 3. For example, the photon generator may include a photon emitter and an amplifier. The amplifier may be a tapered amplifier, and the photon emitter and tapered amplifier may form an integrated component, such as a tapered amplifier diode.

The method according to one embodiment may include detecting photons emitted from the photon generator, and providing a detection signal indicative of each detected photon. The detection signal may be indicative of a random characteristic for each detected photon. The method may also include generating a random number based on the detection signal. As mentioned herein, the random characteristic of emitted photons may be a timing characteristic, or in other words, photons emitted from the photon generator may be emitted at random times or intervals. The detection signal may be indicative of this random timing characteristic for detected photons, and therefore, may be used as a basis for generating a random number. For example, the QRNG may utilize the random change in arrival time from one photon to the next as a basis for generating a series of digits, which if strung together may form a random number.

Turning to the illustrated embodiment of FIG. 2, a QRNG for regenerating random numbers is generally designated 200, and includes a photon generator 10. The QRNG 200 may be similar to the QRNG 100 described with respect to the illustrated embodiment of FIG. 1, but with several exceptions. The QRNG 200 may include a filter 20, a first detector 202, a second detector 204, and a beam splitter 208. The QRNG 200 may utilize the property of directional randomness from photons emitted from the photon generator 10 to generate a random number. In one embodiment, the beam splitter 208 may be a 50/50 beam splitter, 50% reflecting and 50% transmitting, so that the first and second detectors 202, 204 may generate a random number according to quantum mechanics. Additionally or alternatively, the beam splitter 208 may also be a directionally dependent device, such as a spatial light modulator configured to send photons from one part of the beam to one detector 202, and photons from another part of the beam to another detector 204.

One or more characteristics of the photons may be used as a basis for generating a random number. For example, depending on the direction of the photons, a transmitted photon may be detected by the first detector 202 as a binary 1 and a reflected photon may be detected by the second detector as a binary 0. As another example, depending on the direction and intensity of the light incident on the beam splitter 208, the difference in intensity measured between the first detector 202 and the second detector 204 may be used to generate a random binary 0 or 1. More light per unit time on detector 202 may indicate a 0, while more light per unit time on detector 204 may indicate a 1. A processor 206, such as a counter, may be operably coupled to the first and second detectors 202, 204 to count incidences of zeros and ones, thereby generating a random number. The photon generator 10 in this embodiment may be similar to the photon generator 10 described above with respect to the illustrated embodiment of FIG. 3.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A quantum random number generator comprising:
   a photon emitter capable of emitting photons in a spontaneous mode;
   a power supply coupled to said photon emitter, said power supply capable of supplying power to said photon emitter to operate in said spontaneous mode;
   an amplifier having a photon input and a photon output, said photon input being operably coupled to said photon emitter to receive photons emitted from the photon emitter, said photon output being in optical communication with the photon input and configured to emit photons received by the photon emitter, wherein a characteristic of the photons emitted from the amplifier is random.

2. The quantum random number generator as claimed in claim 1 wherein said amplifier is a tapered amplifier, wherein said tapered amplifier includes an optical cavity between the photon input and the photon output, and wherein at least a portion of said optical cavity is tapered.

3. The quantum random number generator as claimed in claim 2 wherein said photon emitter and said tapered amplifier form an integrated component, wherein said integrated component is a tapered amplifier diode.

4. The quantum random number generator as claimed in claim 3 wherein a current of power supplied to said tapered amplifier diode is controlled by said power supply to achieve operation in said spontaneous mode, and wherein said spontaneous mode includes operation of the photon emitter below a lasing threshold.

5. The quantum random number generator as claimed in claim 1 further comprising a detector configured to detect photons emitted from the photon output of said amplifier, wherein said detector provides a detection signal indicative of detected photons.

6. The quantum random number generator as claimed in claim 5 further comprising a processor coupled to said detector, wherein said processor is programmed to generate a random number based on said detection signal, wherein said detection signal is indicative of said characteristic for each detected photon.

7. The quantum random number generator as claimed in claim 6 wherein said characteristic of each detected photon is a timing characteristic, wherein said processor is programmed to identify an arrival time of each detected photon based on said detection signal, and wherein said processor is programmed to generate said random number based on said arrival times of said detected photons.

8. The quantum random number generator as claimed in claim 7 wherein said characteristic of each photon conditions a multiplexer to generate a multiplexed signal without bias.

9. The quantum random number generated as claimed in claim 7 further comprising a multiplexor configured to generate a multiplexed signal in which a bias of the quantum random number generator is removed by multiplexing a first distribution of a first random number and a second distribution of a second random number, wherein said first random number is said random number.

10. A quantum random number generator comprising:
    a photon generator capable of emitting photons while being operated below a lasing threshold;
    a power supply coupled to said photon generator, said power supply capable of supplying power to said photon generator to operate below the lasing threshold of the photon generator, wherein a characteristic of the photons emitted from the photon generator is random;
a detector configured to detect photons emitted from the photon generator, wherein said detector provides a detection signal indicative of each detected photon;
a processor coupled to said detector, said processor programmed to generate a random number based on said detection signal, wherein said detection signal is indicative of said characteristic for each detected photon; and
wherein said photon generator includes a photon emitter and an amplifier having a photon input and a photon output, said photon input being operably coupled to said photon emitter to receive photons emitted from the photon emitter, said photon output being in optical communication with the photon input and configured to emit photons received by the photon emitter.

11. The quantum random number generator as claimed in claim 10 wherein said amplifier is a tapered amplifier, wherein the tapered amplifier includes an optical cavity between the photon input and the photon output, and wherein at least a portion of said optical cavity is tapered.

12. The quantum random number generator as claimed in claim 11 wherein said photon emitter and said tapered amplifier form an integrated component, wherein said integrated component is a tapered amplifier diode.

13. The quantum random number generator as claimed in claim 11 wherein a current of power supplied to said tapered amplifier diode is controlled by said power supply to achieve operation of the tapered amplifier diode in said spontaneous mode.

14. The quantum random number generator as claimed in claim 10 wherein said characteristic of the photons emitted from the amplifier includes at least one of a timing of the photons and a direction of the photons.

15. The quantum random number generator as claimed in claim 14 wherein said processor is programmed to identify arrival times of photons based on said detection signal, and wherein said processor is programmed to generate said random number based on said arrival times of said detected photons.

16. The quantum random number generator as claimed in claim 10 wherein the photon generator operates in a spontaneous mode while being operated below a lasing threshold of the photon emitter.

17. A method of generating a random number with a quantum random number generator, said method comprising:
operating a photon generator below a lasing threshold of the photon generator to emit photons, wherein a characteristic of the photons emitted from the photon generator is random;
detecting the photons emitted from the photon generator;
outputting a detection signal indicative of each detected photon, wherein the detection signal is indicative of the characteristic for each detected photon;
generating a random number based on the detection signal; and
wherein the photon generator includes a photon emitter and an amplifier, wherein the photon emitter is operably coupled to a photon input of the amplifier, and wherein the amplifier includes a photon output in optical communication with the photon input and configured to emit photon received by the photon input.

18. The method as claimed in claim 17 wherein amplifier is a tapered amplifier, and wherein the photon emitter and the amplifier are an integrated component forming a tapered amplifier diode.

19. The method as claimed in claim 17 wherein said operating a photon generator includes operating the photon generator in a spontaneous mode.

20. The method as claimed in claim 17 further comprising identifying arrival times of detected photons based on the detection signal, and generating the random number based on the arrival times of the detected photons.

* * * * *